United States Patent [19]

Smith

[11] Patent Number: 4,779,567

[45] Date of Patent: Oct. 25, 1988

[54] DISPOSABLE PET LITTER BOX PACKAGE

[76] Inventor: Linda B. Smith, 15135 Marl Dr., Linden, Mich. 48451

[21] Appl. No.: 61,898

[22] Filed: Jun. 11, 1987

[51] Int. Cl.⁴ .............................................. A01K 29/00
[52] U.S. Cl. ....................................................... 119/1
[58] Field of Search ............................................ 119/1

[56] References Cited

U.S. PATENT DOCUMENTS

| Re. 30,424 | 11/1980 | Heldenbrand | 119/1 |
|---|---|---|---|
| 2,609,897 | 9/1952 | Meyer | 206/278 |
| 2,645,407 | 7/1953 | Bergstein | 229/52 A |
| 3,112,058 | 11/1963 | Martin | 229/122 |
| 3,684,155 | 8/1972 | Smith | 229/148 |
| 3,735,735 | 5/1973 | Noroian | 119/1 |
| 3,743,170 | 7/1973 | Riccio | 229/33 |
| 3,771,493 | 11/1973 | Chandor | 119/1 |
| 3,886,901 | 6/1975 | Zeitter | 119/1 |
| 3,890,930 | 6/1975 | Clark | 119/1 |
| 3,978,818 | 9/1976 | Heldenbrand | 119/1 |
| 4,014,292 | 3/1977 | Coughlin et al. | 119/1 |
| 4,305,544 | 12/1981 | Noonan | 229/35 |
| 4,441,451 | 4/1984 | Neal | 119/1 |
| 4,501,226 | 2/1985 | Bienvenu et al. | 119/1 |
| 4,548,160 | 10/1985 | Feitelson | 119/1 |
| 4,628,863 | 12/1986 | Eichenauer | 119/1 |

FOREIGN PATENT DOCUMENTS 2222942  3/1973  France .................. 119/1

Primary Examiner—Robert P. Swiatek
Assistant Examiner—Mary McNeil
Attorney, Agent, or Firm—Irvin L. Groh; Alfred L. Patmore, Jr.

[57] ABSTRACT

A self-contained, convenient and sanitary disposable pet litter box is packaged with litter material and a box disposal bag. The box and cover is a one piece, non-collapsible structure, and a handle provides the convenience of a carrying case.

10 Claims, 1 Drawing Sheet

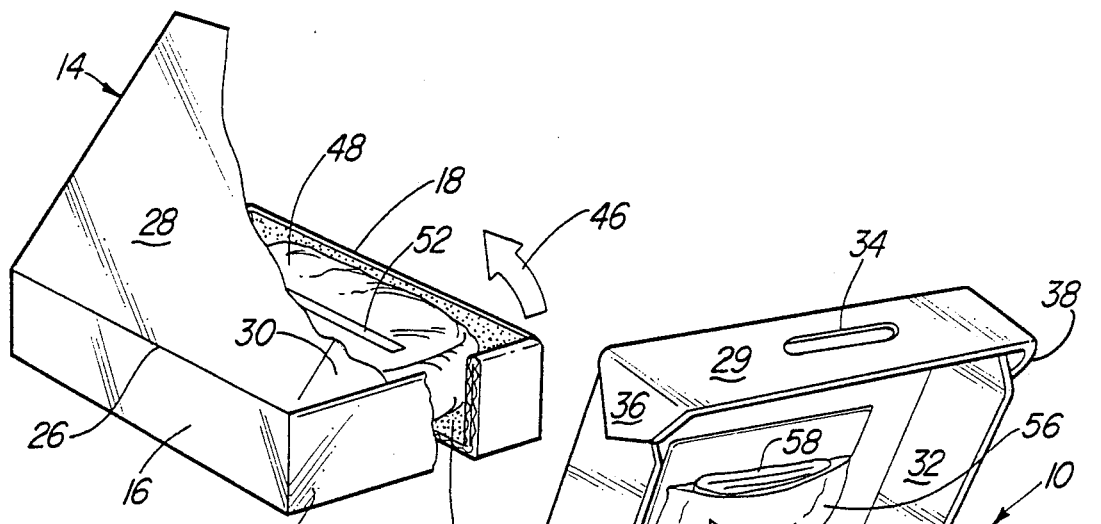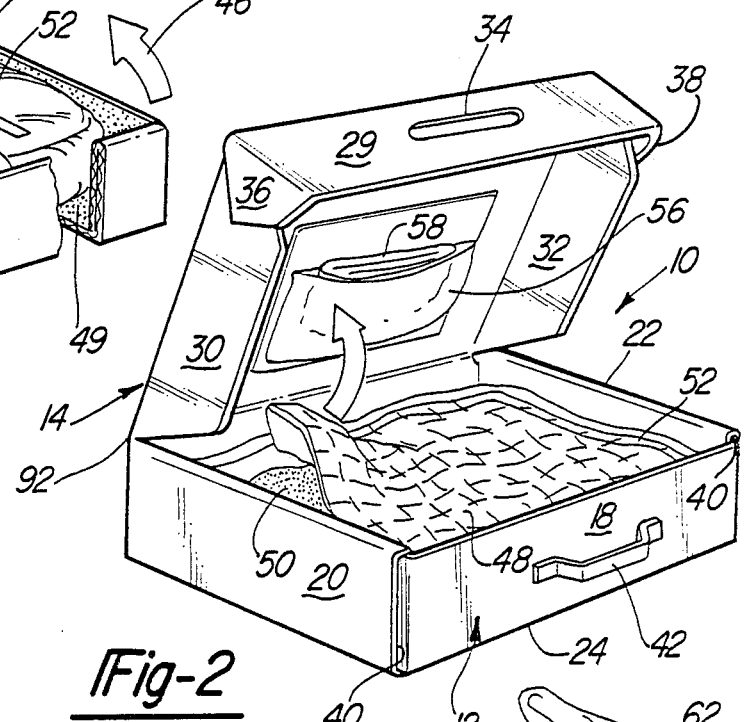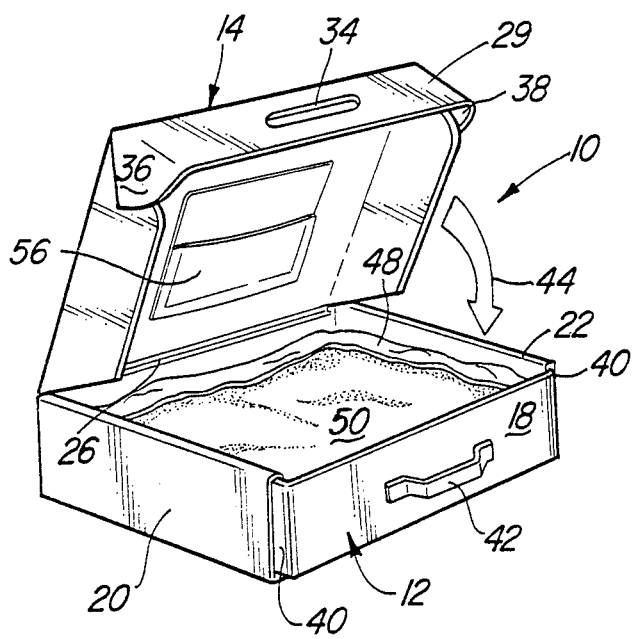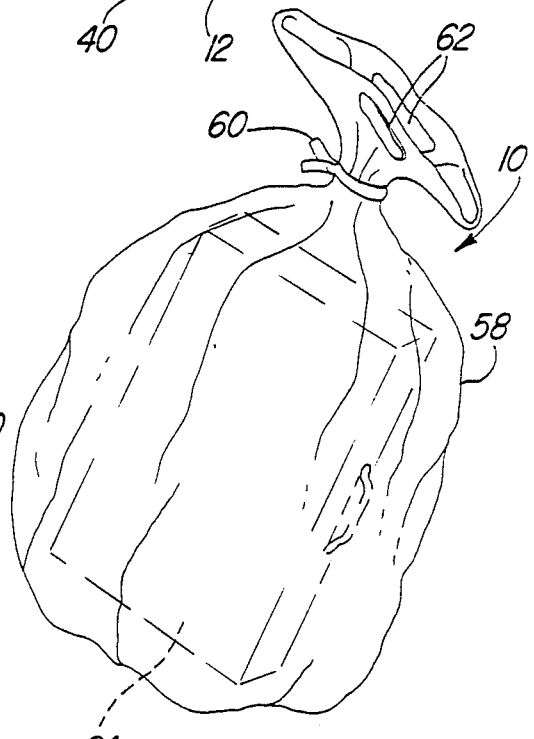

DISPOSABLE PET LITTER BOX PACKAGE

This invention relates to pet litter boxes utilized in the home to provide a convenient place for the pet's waste, and, in its most common form for cats, to provide a place for the cat to perform its natural instinct of burying its feces. Litter boxes, commonly referred to as "kitty litter" boxes are used to contain a granular or particulate litter material to absorb the urine. More particularly, this invention is directed to a sanitary, self-contained, disposable pet litter box.

Most commonly, litter material is sold in the bulk and is poured from its containing bag into a tray constituting the box which is usually made of plastic material for cleaning purposes. At best, this presents a disagreeable task for the pet owner in disposing of the used litter material and in washing and drying the tray for reuse.

With the general trend to provide customer convenience and with the specific purpose of providing sanitary disposal, there have been a number of litter boxes designed to accept a disposable liner into which the fresh litter is poured and in which the used litter is disposed as a typical garbage or trash bag. This still involves purchasing the litter in bulk packages, purchasing liners and handling both. The continuing trend in convenience has lead to the design of various disposable litter boxes which either use a moisture resistant liner or coating on the box interior. The packaging of disposable litter boxes has taken the form of various collapsible box designs which prove advantageous in shipping and retail stocking because of space economies. Unfortunately, the collapsible box has provided another source of vexation to the purchaser who must assemble the box to its usuable form. Even where the box comes prepackaged with litter, there has been little public acceptance as evidence by the lack of availability of such products in the market place.

It is to the provision of a completely self-contained, convenience oriented, sanitary and disposable pet litter box package to which this invention is directed. In accordance with this objective, a non-collapsible box is provided so that it is ready for use without requiring assembly. An open-top rectangular box is provided having an innerconnected bottom wall, first and second opposed side walls and opposed end walls. A cover is attached to the first box side wall as a continuation thereof with a fold-line hinge between the box side wall and the covered top wall. The cover also has a side wall for overlapping closure with the second box side wall. A carrying handle is attached to the side wall of the closed box to provide the convenience of a carrying case.

The handle is normally attached to the second box side wall and extends through the side wall of the cover when it is in its closed as-packaged position over the open box top. It will be appreciated that with the handle located on the second box side wall or the side wall opposite the hinge, the projection of the handle through a hole or aperture in the cover side wall, a locking or structural package integrity function is accomplished. The handle can be functionally located on the cover side wall or on the cover or box end walls, particularly where the lid is secured by adhesive spotting or with a package overwrap.

A bag of litter is contained in the box, and in the a preferred embodiment of the invention, this bag is secured to the box as on the bottom and around the periphery of the side and end walls to serve as a moisture resistant interior surface of the box. This bag is made of a tough plastic material to withstand abrasion as that created by a cat's paw. In a preferred embodiment, the material of the bag is also is anti-static to eliminate dust contamination in the initial opening of the bag and in its continuing use. In a preferred embodiment, the bag is provided with a zip top so that the top portion of the bag can be easily removed for use.

Alternatively, the interior surfaces of the box can be coated or laminated with a moisture resistant or water proof material which also has anti-static properties. In this case, the litter would be contained in a separate bag which preferably is also made with a material having anti-static properties.

The entire box with its used contents can be disposed of by closing the cover. In a preferred embodiment of the invention, a disposal bag is contained within the box. The disposal bag is dimensioned to contain the box and cover in its closed position for disposal with its used litter contents. The disposal bag can be provided with convenient holding handles and a tie to seal the bag. Preferably, a pocket is provided on the interior surface of the cover top which contains the disposal bag until it is ready to be used for disposal.

The objectives of this invention are accomplished by the embodiments disclosed in the following description and illustrated in the drawing in which:

FIG. 1 is a perspective view of the litter box incorporating the invention showing the lid in a partially elevated position with the litter containing bag in its sealed condition and the moisture resistant interior surface of the box being provided by a coating or lamination of the interior walls of the box;

FIG. 2 is a perspective view of the litter box showing it in a further opened position with the litter containing bag serving the dual function of containing the litter and being attached to the bottom, side and end walls to provide moisture resistance and antistatic properties; the litter containing bag is shown in a partially opened position;

FIG. 3 is a perspective view similar to FIG. 2 showing the cover pocket of FIG. 2 after removal of the disposal bag with the lid in a partially closed position; and FIG. 4 shows the closed box and lid contained with a disposal bag secured by a tie.

Disposable pet or kitty litter box package 10 is shown as including rectangular open-top box 12 with attached cover 14. Box 12 has opposed side walls 16 and 18 opposed side walls 20 and 22, and bottom wall 24. Cover 14 is formed integrally with box 12 or as an extension of box side wall 16 having an intermediate fold line hinge 26 delineating cover top 28. Cover 14 has a side wall 29 and opposed end walls 30 and 32. Lid side wall 29 has a centrally located elongated slot 34 and flaps 36 and 38 at each end. Box side walls 20 and 22 are of a folded over construction providing a slot 40 at either end of box front side wall 18 and side walls 20 and 22. Carrying handle 42 is centrally mounted on box side wall 18.

As the lid 14 is swung or rotated about hinge line 26 from an open position towards a closed position, as shown by arrow 44 in FIG. 3, the cover end walls 30 and 32 are tucked into the box inside side walls 20 and 22 as best shown in FIG. 1. In the fully closed position, flaps 36 and 38 lock into slots 40 between box front side wall 18 and side walls 20 and 22 with the handle 42 projecting through slot 34 in cover side wall 29. Engagement of handle 42 in slot 34 tends to lock the box together in its as-packaged condition and in the closed position for disposal. Optionally, the lid may be secured to the box by spot gluing between cover end wall 30 and 32 and box side walls 20 and 22 or between cover side wall 29 and box side wall 18. Other conventional means can be used to seal the cover to the box such as a tape strip along the seam between the cover side wall 29 and the box bottom wall 24. Also the entire package 10 can be inserted in an overwrap or shrink fit envelope which allows access to handle 42.

As the lid 14 is opened as shown by arrow 46 in FIG. 1, bag 48 containing litter 50 is exposed. The litter 50 is a granular or pulverant material such as natural clay or a synthetic compound which is capable of absorbing moisture or urine. It also may be treated with a disinfectant or deodorizing compound. Litter containing bag 48, as shown in FIG. 1, is freely contained in box 12 and is opened for dispensing by removal of zip top or tear strip 52 of any suitable design. The internal side walls, end walls and bottom wall of box 12 is coated with a moisture proof material 49 which also contains an antistatic ingredient. This eliminates dust dispersion in use. Also, the bag 48 may be made of antistatic material to eliminate dust when it is dispensed within the interior of box 12.

In a preferred embodiment of the invention as shown in FIGS. 2 and 3, the bag 48 is secured to box 12 to provide the water proof or moisture resistant and antistatic interior and the box interior is not coated. A suitable material for bag 48 is a three layer structure which includes two tough and slippery outer polyethlyene layers and an internal carbon ink grid work to provide an electrostatic discharge bag. In the FIGS. 2 and 3 structure, the bag 48 would be secured along the upper periphery of the box against side walls 16 and 18 and side walls 20 and 22 by an adhesive which can take the form of a hot glue. The bag 48 can be constructed with a sealing strip 52 which is removed as the top portion of the bag is pulled upwardly as shown in FIG. 2.

As shown in FIGS. 2 and 3, plastic pocket 56 is attached to the interior surface of cover top 28. The plastic disposal bag 58 is contained within the pocket 56 for disposing of the used box, lid and litter content. The disposal bag 58 remains in pocket until it is time to dispose of the litter box. Tie 60 may also be contained in the envelope 56 for sealing the end of the disposal bag 58. Also, the end of the disposal bag 58 may be provided with handle cutouts 62 for convenience in handling.

The embodiments of the invention in which an exclusive property or privilege is claimed are defined as follows:

1. A non-collapsible disposable pet litter box package comprising, in combination:
    an open-top rectangular box having an interconnected bottom wall, first and second opposed side walls and third and fourth opposed side walls;
    a cover attached to said first side wall of said box with a fold-line hinge, said cover having a top wall, a pair of opposed end walls, and a side wall opposite from said fold-line hinge, said side wall of said cover adapted to overlap said second side wall of said box when said cover is in a closed, as-packaged position;
    a carrying handle attached to said second side wall of said box and extending through an opening in said cover side wall when the cover is in said closed, as-packaged position over the box top;
    a bag of litter in said box for use therein when the box is opened by swinging said cover to an opened position about said hinge;
    wherein said end walls of said cover are dimensioned so that, with said cover in said closed position, one cover end wall is closely adjacent and parallel to the third side wall of the box while the other cover end wall is closely adjacent and parallel to the fourth side wall of the box,
    the interior surfaces of said box are moisture resistant; and
    a disposable bag contained in said box, said bag being dimensioned to contain said box and said cover when in said closed position,
    whereby said package provides the convenience of a handle carrying case and is self-contained for use and disposal with its used litter contents by placing said box in said bag.

2. The disposable litter box package of claim 1 wherein said cover side wall has transverseley extending flaps at each end which, in the closed postion of said cover engage slot openings formed between the second side wall and the third and fourth side walls of said box.

3. The disposable litter box package of claim 1 wherein said box and lid are formed from a single sheet of paperboard.

4. The disposable litter box package of claim 1 wherein the interior surfaces of said box are coated to provide the moisture resistance.

5. The disposable litter box package of claim 4 wherein said coating further provides an antistatic surface.

6. The disposable litter box package of claim 1 wherein the bag of litter includes a plastic bag which is secured to the box to provide the moisture resistant interior surfaces of the box.

7. The disposable litter box package of claim 6 wherein the bag of litter has a zip top for opening the bag to expose the litter for use.

8. The disposable litter box package of claim 6 wherein said litter containing bag is manufactured with an antistatic material.

9. The disposable litter box package of claim 1 wherein said disposal bag is contained in said box when the cover is in its closed as-packaged position.

10. The disposable litter box package of claim 1 further including a pocket attached to the interior of said cover top and said disposal bag being contained therein.

* * * * *